Oct. 23, 1923.

W. B. SCHULTE

WAVE SIGNALING SYSTEM

Filed Oct. 17, 1919

Inventor
Walter B. Schulte
By his Attorneys
Pennie Davis Marvin & Edmonds

Inventor
Walter B. Schulte
By his Attorneys.
Pennie Davis Marvin & Edmonds.

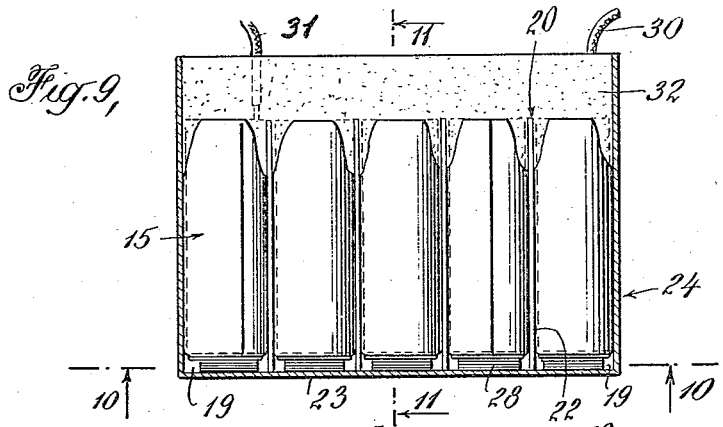

Patented Oct. 23, 1923.

1,471,756

UNITED STATES PATENT OFFICE.

WALTER B. SCHULTE, OF MADISON, WISCONSIN, ASSIGNOR TO BURGESS BATTERY COMPANY, A CORPORATION OF WISCONSIN.

WAVE SIGNALING SYSTEM.

Application filed October 17, 1919. Serial No. 331,411.

*To all whom it may concern:*

Be it known that I, WALTER B. SCHULTE, a citizen of the United States, residing at Madison, in the county of Dane, State of Wisconsin, have invented certain new and useful Improvements in Wave Signaling Systems, and I do hereby declare the following to be a full, clear, and exact description of the invention, such as will enable others skilled in the art to which it appertains to make and use the same.

This invention relates to wave signaling systems utilizing vacuum tubes and it enables certain circuits of the system to be freed from low frequency current disturbances of the species which arise from within the circuit, by the use of a thermionic discharge device and a dry battery constructed in such a manner as will substantially prevent the combination from setting up low frequency current disturbances within a circuit.

In modern wave signaling systems such as radiotelegraph, radiotelephone, ground telegraph, long distance wire telephone, and multiplex wire telephone systems, dry batteries are generally used as the standard source for supplying small electric currents to the circuits in which a thermionic discharge device is connected. The most usual form of this device is known as the three-electrode vacuum tube and it comprises a cathode or incandescent filament and two cold anodes known as the grid and plate, respectively, although it may comprise only two electrodes in which form it is known as a two-electrode vacuum tube and comprises a cathode or incandescent filament and a cold anode or plate. The filament is usually furnished with current from a storage battery because of the high value of the filament current, but large dry batteries may be used for this purpose. In either case this battery is known as the filament or A battery. The battery furnishing the plate potential in the filament plate circuit is generally known as the B battery and a battery in the filament grid circuit is usually known as the C battery. The standard practice at the present time is to use dry batteries for the B and C batteries in electric wave receiving apparatus. The plate filament potential or B potential for transmitting purposes is usually high, and it may be of the order of 250 volts and upwards. This high potential may be supplied directly from storage batteries or large dry cells, but it is generally supplied from a low current high voltage direct current generator.

This invention applies more particularly to the plate-filament circuit of a wave receiving system, which includes the B battery and the filament and plate of a three-electrode or two-electrode vacuum tube. This invention also applies, although to a lesser degree, to the circuits containing the A and C batteries, at least in so far as its advantages are known at the present time.

The combination in a receiving circuit of a wave signaling system of the usual small multi cell dry B battery comprising from about 10 to 20 cells or more and designed to yield a small current at a potential of about 15 to 40 volts or more, depending upon the number of small cells forming the dry battery, and a three-electrode vacuum tube connected in this circuit through the filament and plate, usually results in the production of considerable low frequency current disturbance in this circuit which manifests itself by clicks and so-called noises in the telephone receivers. The presence of this disturbance is extremely undesirable when signals are being received because it interferes with the accurate reception of the signals. The same is true if other forms of indicating devices are used instead of the usual telephones.

These low frequency current-disturbances, in accordance with this invention, are substantially prevented from being set up in the filament plate circuit and filament grid circuit of a vacuum tube by the use of a combination of a three-electrode vacuum tube and a dry battery so constructed and arranged that the component cells of such a battery are effectually prevented from short-circuiting adjacent cells even in the event of leakage of any of the cells or of entry of moisture into the jacket or container in which the battery is fitted. The preferred arrangement of the cells comprising such a battery is set forth in my copending application, Serial No. 282,395, filed March 13, 1919.

The C battery is used to fix the mean potential of the grid of a three-electrode vacuum tube at any point on its characteristic curve and it determines the operation of the tube as a rectifier or as an amplifier. There being practically no current flow from the C battery when used in combination with a three-electrode vacuum tube, it is impossible to state accurately to what extent the usual C dry battery in combination with the tube produces noises and clicks. It has been found, however, that a system using both B and C batteries of the type herein described in combination with a three-electrode vacuum tube, in accordance with this invention, is unusually free from low frequency current disturbances as evidenced by the absence of noises and clicks in the telephone receivers as described above.

It has been pointed out that the filament of a standard vacuum tube is usually supplied with electric current from a storage battery because of the high current consumption of the filament, for example, in a tube having a filament designed to operate on about four volts, the filament current may be of the order of 1 to 1.5 amperes or possibly higher. However, small muti-electrode vacuum tubes have been constructed in which the filament current is only about 0.2 amperes, and, therefore, the filament or A battery may be a dry battery of the type herein described and the combination in accordance with this invention of such a small tube with a dry battery will operate to prevent low frequency current disturbances from being set up in the thermionic current flowing from the filament to the plate.

Considered apart from a wave signaling system, although functioning in substantially the same manner, a three-electrode vacuum tube may be described as a thermionic relay. The three-electrodes in this case are electrically connected to an external circuit which includes a B battery so arranged as to make the filament a cathode (negative) and the plate an anode (positive) for a thermionic discharge through the bulb. The grid may be considered an auxiliary anode whose purpose is to control the main discharge to the plate by variations in its potential relative to the filament. Aside from its described function, the same remarks apply with reference to the combination of a tube and dry battery as a thermionic relay, as those fully set forth when the combination was described in connection with a wave signaling system.

It is not possible to state the exact cause of the low frequency current disturbances, but it has been ascertained that disturbances of this nature are substantially or totally prevented when the combination of a thermionic discharge device and a dry battery is used, the battery being constructed as described herein.

This invention will be understood from a consideration of the following description, reference being had to the accompanying drawings, in which:

Fig. 9 is a side elevation of a dry battery showing the container or jacket of the battery in section;

Fig. 10 is a horizontal section taken on line 10—10 of Fig. 9;

Fig. 11 is a vertical cross section on an enlarged scale taken on the line 11—11 of Fig. 9; and Fig. 12 illustrates a method of connecting the cells forming the dry battery.

Figure 1:
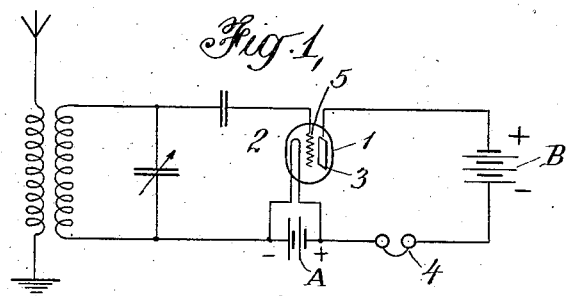
Fig. 1 represents a circuit diagram of a radio telegraph or telephone receiving system.
Figure 2:
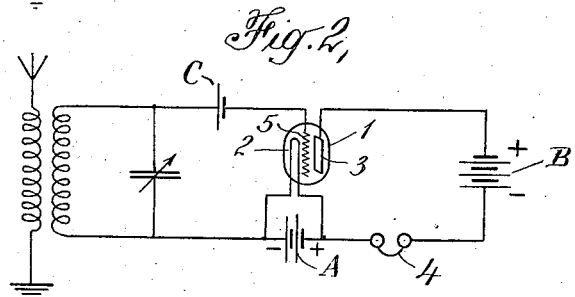
Fig. 2 represents a circuit diagram of a radio telegraph or radio telephone receiving system in which a C battery is used.

The B batteries of Figs. 1 to 6 inclusive, may be batteries of the type illustrated in Figs. 9, 10 and 11, in order that the combination of the vacuum tubes 1, having a filament 2 and a plate 3 and the B batteries, may prevent the setting up of low frequency current disturbances in the plate filament circuit 3—B—2 of the system so that clicks and noises are not produced in the telephone receivers 4.

The use of the combination of the vacuum tube 1 and a battery C in the filament grid circuit 5—C—2, aids considerably in the elimination of noises and clicks in the telephone 4.

Figure 3:
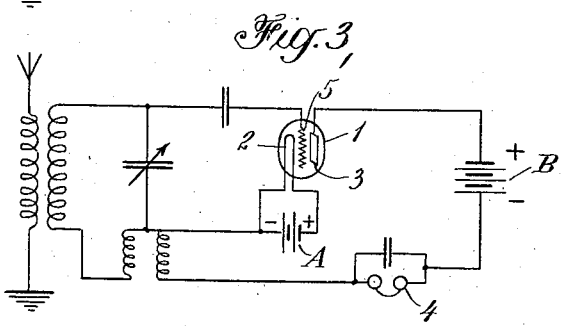
Fig. 3 represents a circuit diagram of a regenerative radio telegraph receiving system.
Figure 4:
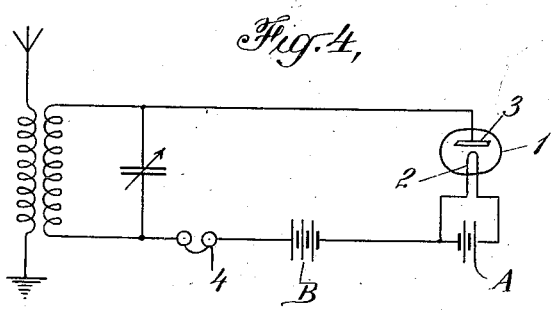
Fig. 4 represents a receiving circuit diagram of a wave signaling system using a two electrode vacuum tube.
Figure 5:
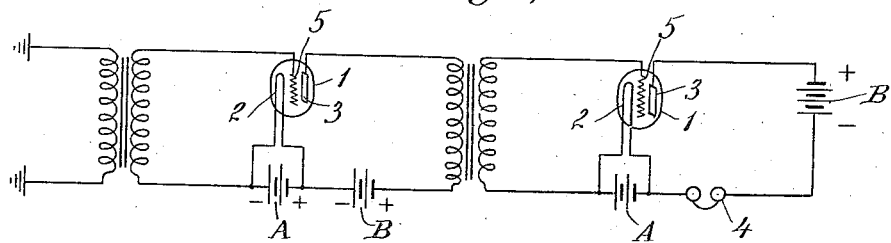
Fig. 5 represents a circuit diagram of a ground telegraph receiving system.

In Fig. 3 the combination of the vacuum tube 1 and the B battery is especially advantageous inasmuch as the circuit is regenerative requires critical adjustment for efficient operation. The presence of low frequency current disturbances would render this adjustment difficult to obtain and retain.

Figure 6:
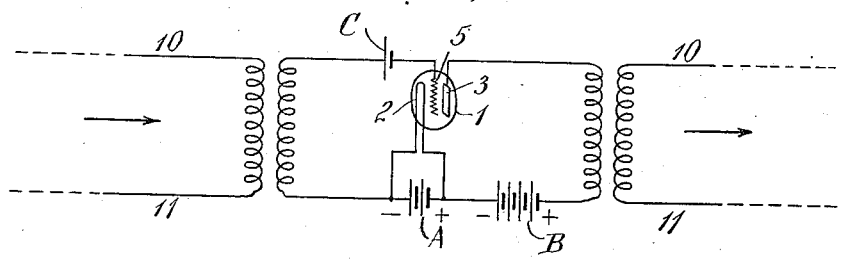
Fig. 6 represents a telephone system in which a three-electrode vacuum tube using both B and C batteries is arranged to amplify voice currents.

In Fig. 6 the combination of the vacuum tube 1 with the B and C batteries results in an unusual freedom of voice current distortion and noises and clicks in the telephone lines 10, 11. The vacuum tube 1 in this case amplifies the voice currents supplied to it in the direction of the arrows.

Figure 7:
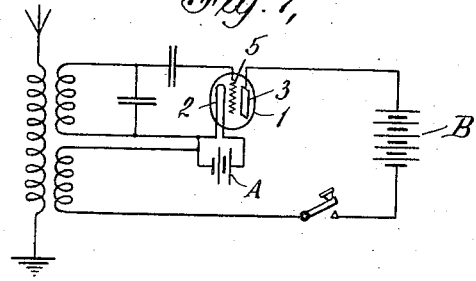
Fig. 7 represents a circuit diagram of a transmission system using a three-electrode vacuum tube for generating the continuous oscillations.

Fig. 7 shows the use of a combination of a vacuum tube 1 with a dry battery B in a transmission system in which low frequency current disturbances existing in the plate filament circuit would tend to lower the efficiency of operation were such disturbances present.

Figure 8:
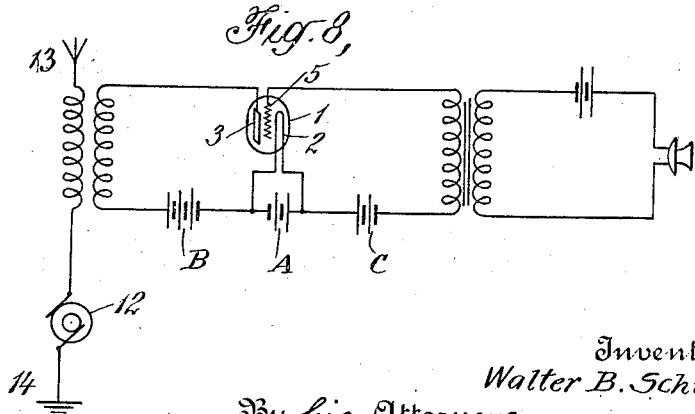
Fig. 8 represents a circuit diagram showing the use of a three-electrode vacuum tube as a modulator in a wireless telephone transmission system, in which both B and C batteries are used.

In Fig. 8 the vacuum tube 1 in combination with both B and C batteries is used to modulate the oscillations generated by the high frequency alternator 12, for wireless telephone purposes. In this case both the combination of the vacuum tube 1 with the C battery and the B battery tends to more perfectly amplify the voice currents supplied to the grid filament circuit which are finally impressed upon the antenna circuit 13, 14, and which at the same time does not impress any low frequency current disturbances which might tend to distort the modulated energy.

Referring to Figs. 9, 10 and 11, the multi-cell dry battery is shown as comprising a series of small cylindrical cells 15, each cell embodying a zinc can or cup 16 forming one electrode of the cell and a carbon rod 17 forming the other electrode, each carbon rod being fitted with a metal terminal or cap 18. The cells are arranged vertically in individual compartments 19 provided for them in a nest 20 which is constructed of interlocking longitudinal and transverse strips 21 and 22 of pasteboard or other suitable sheet material, preferably impregnated with a waterproof substance such a paraffin. The lower edges of the strips 21 and 22 rest directly upon the bottom member 23 of a pasteboard case or jacket 24, likewise impregnated with paraffin, which is adapted to contain the battery and which forms the bottom wall of the compartments, the side edges of the strips contacting directly with the end and side walls 25 and 26 of the case. The several dimensions of the compartments are somewhat greater than those of the cells, so that under ordinary conditions the cells would be maintained out of contact at all points with the walls of the compartments, the space between the lower ends of the cells and the bottom wall of the case exceeding that which would ordinarily exist between the side walls of the cells and their compartments. These spaces, however, are taken up to some extent by the wrappers 27 in which the cells are encased, the wrappers being fitted on the cells prior to the insertion of the latter in their compartments. They are constructed of sheets of waxed paper which completely enclose the cells with the exception of their upper ends, which are left open, the lower edges of the wrappers being tucked under and folded against the bottoms of the cells as indicated at 28 so that an increased thickness of wrapping is provided at such points.

After having been fitted with their paper wrappers in the manner above described, the cells are inserted in their compartments, and are thereafter electrically connected together by wire strips 29, which extend from the zinc electrode of one cell to the carbon electrode of the next cell, the several wires being soldered or otherwise fastened at one end to the upper ends of the zinc cans and at the other end to the brass caps 18. Suitable conducting leads 30 and 31 are than attached to the cells, and the latter and their nest are then inserted in the case or jacket 24, though this second step may take place before the connection of the cells is effected; or, if preferred, the nest may be inserted in the case prior to the positioning and connection of the cells. The nest itself terminates some distance below the upper edge of the case, and is fixed therein, together with the cells, by a seal 32 of pitch or other suitable substance which fills the upper portion of the case and penetrates a slight distance into the compartments 19, thus coming into contact with the paper wrappers on the cells, as well as with the walls of the compartments, and serving to anchor the cells in place. In this way, the entire structure is transformed into a single unitary body or unit in which the cells are rigidly sealed in the nest as well as in the case itself, and their wrappers securely fastened thereon, while the electrical connections between the cells are embedded in the material forming the seal and, hence, are not liable to become detached or injured.

Owing to the fact that the bottoms of the cells terminate short of the bottom wall 23 of the case, whereas the lower edges of the partition strips 21 and 22 rest on said walls 23, any liquid which may collect on the bottom of a compartment, whether from an extraneous source or from leakage, will not touch the cell in the compartment, and moreover, will not ordinarily penetrate into the adjacent compartments but will tend to remain in the compartment in which it originated. Consequently, the danger of adjacent cells becoming short-circuited because of the presence of moisture is greatly reduced, especially since the walls both of the nest and of the case are rendered water-repellant by being treated with paraffin. The effects thus produced are furthered and increased to a very considerable extent by the provision of the paraffined wrappers in which the cells are encased, for these wrappers not only interpose a layer of water-repellant material on all sides of the cells and between the latter and the corresponding walls of the compartments, which prevents exposure of the zinc and consequent leakage in the event of corrosion taking place, but they provide a double or triple thickness of such material at the only point where moisture can accumulate to an appreciable extent from any source. Hence, the continued efficiency of the battery while in use, and an exceptionally long shelf life thereof, are insured without adding to any great extent to the initial cost of the battery.

I find that some advantage arises from the special mode of connecting the cells in series shown in Fig. 12. In the embodiment illustrated, the maximum voltage between any two adjacent zinc electrodes does not exceed five times the voltage of a single cell, even though the total voltage of the battery may be several times this amount.

It is my present opinion that the capacity reactance of a series of dry cells may in certain of the circuits illustrated, have something to do with the "noise" in a wave signaling system in which an A, B or C battery is used. Each pair of adjacent zinc electrodes, with their intervening air gap or other di-electric, constitute, in effect, a condenser, sensitive, perhaps to the high and low frequency effects with which we here have to deal. I believe that the above described method of encasing each cell in a paraffined wrapping reduces the condenser action and has a beneficial effect, quite apart from the question of moisture leaking from the cans or otherwise reaching their exterior.

But whatever the underlying principles involved, this kind of a dry battery in circuits of the type described give freedom from the noises and other disturbances that have often proved so troublesome.

I claim:

1. In a wave signaling system utilizing a vacuum tube and including electric circuits each containing a source of electric energy, said circuits requiring freedom from low frequency current-disturbances originating from within each circuit, the combination of a multi-electrode vacuum tube through which a thermionic discharge is maintained by reason of its connection in one of said circuits and dry batteries as the said sources, said batteries each comprising a case, a nest fitted therein, a set of vertical cells arranged in the nest and spaced at their lower ends from the bottom of the case, a water-repellant wrapper completely encasing each cell, and a seal anchoring the cells in said nest and the wrappers to said cells.

2. In a wave signaling system utilizing a vacuum tube and including an electric circuit containing a source of electric energy, said circuit requiring freedom from low frequency current-disturbances originating from within said circuit, the combination of a multi-electrode vacuum tube through which a thermionic discharge is maintained by reason of its connection in said circuit, and a dry battery as the said source, said battery comprising a case, a nest fitted therein providing a set of separate vertical compartments, and a set of cells fitted in said compartments with their lower ends spaced from the bottoms of the compartments.

3. In a wave signaling system utilizing a vacuum tube and including an electric circuit containing a source of electric energy and a telephone receiver, said circuit requiring freedom from low frequency current-disturbances originating from within said circuit, the combination of a multi-electrode vacuum tube through which a thermionic discharge is maintained by reason of its connection in said circuit and a dry battery as the said source, said battery comprising a case, a nest fitted therein, and a set of cells anchored in the nest at their upper ends and having their lower ends spaced from the bottom member of the case, each cell having a water-repellant wrapper completely encasing it.

4. In a wave signaling system utilizing a vacuum tube and including an electric circuit containing a source of electric energy and an indicating device, said circuit requiring freedom from aperiodic low frequency current-disturbances originating from within said circuit, the combination of a multi-electrode vacuum tube through which a thermionic discharge is maintained by reason of its connection in said circuit and a dry battery as the source, said battery comprising a case, a nest fitted therein, a set of vertical cells arranged in the nest and spaced at their lower ends from the bottom of the case, electrical connection between the upper ends of the cells, and a seal anchoring said cells in said nest and embedding said electrical connections.

5. In a thermionic relay, including an electric circuit containing a source of electric energy, said circuit requiring freedom from aperiodic low frequency current-disturbances originating from within said curcuit, the combination of a three-electrode vacuum tube through which a thermionic discharge is maintained by reason of its connection in said circuit, and a dry battery as the said source, said battery comprising a case, a nest fitted therein, a set of vertical cells arranged in the nest and spaced at their lower ends from the bottom of the case, a water-repellant wrapper completely encasing each cell, and a seal anchoring the cells in said nest and the wrappers to said cells.

6. In a thermionic relay, including a plurality of electric circuits, each of said circuits containing a source of electric energy, and an indicating device in one of said circuits, said circuits requiring freedom from low frequency current-disturbances, the combination of a multi-electrode vacuum tube through which a thermionic discharge is maintained by reason of its connection in one of said circuits and dry batteries as the said sources, each of said batteries comprising a case, a nest fitted therein, a set of vertical cells arranged in the nest and spaced at their lower ends from the bottom of the case, a water-repellant wrapper completely encasing each cell, and a seal anchoring the cells in said nest and the wrapper to said cells.

7. In a wave signaling system utilizing a three-electrode vacuum tube including a filament circuit and a filament-plate circuit containing a source of electrical energy, said circuits requiring freedom from low frequency current-disturbances originating from within said circuits, the combination of a three-electrode tube through which a thermionic discharge is maintained by reason of its connection in said filament and plate-filament circuits, and a dry battery as the said source for said filament-plate circuit, said battery comprising a case, a nest fitted therein, a set of vertical cells arranged in the nest and spaced at their lower ends from the bottom of the case, and a water-repellent wrapper completely encasing each cell, said cells connected electrically in series and grouped to occupy an area of least perimeter and to have a distributed capacity greater than that of the cells in a straight line series.

8. In a battery for supplying electromotive force to multi-electrode vacuum tube circuits sensitive to electrical disturbances originating within the said circuits, comprising a plurality of insulated cells connected electrically in series and grouped to occupy a space having a minimum perimeter and a total aggregative capacity greater than that existing therebetween when connected in a straight line series, whereby the maximum voltage between any two adjacent cells is less than the total electromotive force generated by the said battery, the method of substantially eliminating the effects of current leakage which comprises water-proofing each cell.

In testimony whereof I affix my signature.

WALTER B. SCHULTE.